(12) United States Patent
Kozlowski et al.

(10) Patent No.: US 10,566,847 B2
(45) Date of Patent: Feb. 18, 2020

(54) METHOD FOR DETECTING AN ELECTRICALLY CONDUCTIVE FOREIGN BODY

(71) Applicant: IPT Technology GmbH, Efringen-Kirchen (DE)

(72) Inventors: Peter Kozlowski, Plochingen (DE); Elvys Melo Duarte Almeida, Lörrach (DE)

(73) Assignee: IPT TECHNOLOGY GMBH, Efringen-Kirchen (DE)

( * ) Notice: Subject to any disclaimer, the term of this patent is extended or adjusted under 35 U.S.C. 154(b) by 0 days.

(21) Appl. No.: 15/437,709

(22) Filed: Feb. 21, 2017

(65) Prior Publication Data
US 2017/0244288 A1 Aug. 24, 2017

(30) Foreign Application Priority Data
Feb. 22, 2016 (DE) .................. 10 2016 103 044

(51) Int. Cl.
*H02J 50/60* (2016.01)
*G01D 5/20* (2006.01)

(52) U.S. Cl.
CPC ............... *H02J 50/60* (2016.02); *G01D 5/20* (2013.01)

(58) Field of Classification Search
CPC ........... H02J 50/60; B60L 11/182; G01D 5/20
See application file for complete search history.

(56) References Cited

U.S. PATENT DOCUMENTS

| 5,668,472 A * | 9/1997 | Ohyu .................... G01D 3/032 324/248 |
| 9,281,708 B2 | 3/2016 | Wechlin et al. |
| 2014/0015329 A1 | 1/2014 | Widmer et al. |
| 2015/0109000 A1* | 4/2015 | Sieber ................... G01B 7/003 324/655 |

(Continued)

FOREIGN PATENT DOCUMENTS

| DE | 102009033237 A1 | 1/2011 |
| WO | 2011006758 A2 | 1/2011 |

OTHER PUBLICATIONS

Result of Examination Report for DE 10 2016 103 044.9 dated Sep. 28, 2016.

*Primary Examiner* — Akm Zakaria
(74) *Attorney, Agent, or Firm* — Paul D. Bianco; Stephen Bongini; Fleit Intellectual Property Law

(57) ABSTRACT

A method for detecting an electrically conductive foreign body on a primary coil of an inductive charging station for an electric vehicle using a plurality of measuring inductances, which are arranged, on the primary coil side, in distributed fashion, in the area of the primary coil, facing, during operation, a secondary coil of the electric vehicle, over the cross section of the field region of the primary coil. A plurality of consecutive measurements of different groups of measurement inductances is carried out. Each measurement on a group of measurement inductivities is carried out simultaneously for all the measurement inductances of the group. The measurement inductances of each group are separated from one another by a predetermined minimum distance, which is selected so that the crosstalk between the measurement signals of the individual measurement inductances of each group remains below a predetermined threshold.

18 Claims, 5 Drawing Sheets

(56) References Cited

U.S. PATENT DOCUMENTS

2015/0260835 A1* 9/2015 Widmer .................. G01S 13/04
  342/27
2015/0323694 A1* 11/2015 Roy ....................... H02J 17/00
  307/104
2015/0331135 A1  11/2015 Widmer

* cited by examiner

METHOD FOR DETECTING AN ELECTRICALLY CONDUCTIVE FOREIGN BODY

FIELD OF THE INVENTION

The invention relates to a method for detecting an electrically conductive foreign body on a device for the inductive transmission of electrical energy.

BACKGROUND

Devices for inductive transmission of electrical energy are used, among other purposes, for charging a rechargeable battery installed in an electric vehicle. During energy transmission, a magnetic field of high field intensity and flux density is generated between a stationary primary coil and a secondary coil on the vehicle side. This is necessary in order to induce, in the secondary coil, a sufficiently high current for the desired transmission of power.

If objects made of metal materials are introduced into the region of such a field, eddy currents are induced, which lead to heating, as a function of material, duration of exposure and field intensity level. If corresponding conditions are present, such an object can reach a temperature that can lead to damage, for example, melting, in plastic surfaces, or to hazards to people. The latter occurs particularly if the secondary side has been removed and the heated metal objects are freely accessible so that come in contact with people. For a largely automatic operation of inductive charging stations for electric vehicles, particularly when such charging stations are used in publicly accessible areas, effective security measures are needed to prevent damage and hazards for people due to heated metal foreign bodies.

From DE 10 2009 033 237 A1, a device for the inductive transmission of electrical energy is known, in which, for the detection of a conductive foreign body via the primary coil, a plurality of measuring inductances are arranged, each connected to an impedance measurement device and to a common evaluation device. In the process, a separate impedance measurement device can be associated with each measuring inductance, or several measuring inductances can be connected via an analog multiplexer to a common impedance measurement device. Moreover, the measuring inductances can also be connected to one another to form groups, by means of which the resulting impedance of the entire group is then measured. The publication leaves open the question to which of the mentioned possibilities to give preference.

SUMMARY

The disclosure includes a method for detecting an electrically conductive foreign body using a plurality of measuring inductances, which enables the fastest and most accurate measurement possible.

Advantageous embodiments are also disclosed.

According to the invention, for the detection of an electrically conductive foreign body, on a primary coil of an inductive charging station for an electric vehicle, using a plurality of measuring inductances, which are arranged, on the primary coil side, in distributed fashion, in the area of the primary coil, facing, during operation, a secondary coil of the electric vehicle, over the cross section of the field region of the primary coil, wherein a plurality of consecutive measurements of different groups of measuring inductances is carried out, where each measurement on a group of measuring inductances is carried out simultaneously for all the measuring inductances of the group, and where the measuring inductances of each group are separated from one another by a predetermined minimum distance, which is selected so that the crosstalk between the measurement signals of the individual measuring inductances of each group remains below a predetermined threshold.

The result is that the mutual interference between the measurements of the individual measuring inductances, that is, the measurement error caused by, in the case of adjacent measuring inductances, the magnetic fields originating from each measuring inductance during the measurement, which would affect the detection of a conductive foreign body, can be avoided. Moreover, the foreign body detection occurs as rapidly as possible by the simultaneous measurement of the largest possible number of measuring inductances.

Preferably, the measuring inductances of each group are arranged in distributed fashion in a regular pattern over the cross section of the field region of the primary coil, where the measuring inductances of each group fill in the cross section of the field region of the primary coil sufficiently so that additional measuring inductances of the same group would be located outside of the cross section of the field region in the case of continuation of the regular pattern. As a result, a complete coverage of the field region for the detection of the foreign body is ensured.

In order to accelerate the foreign body detection process, it is advantageous if the measurement signals detected for one group of measuring inductances are evaluated while the measurement signals for the next group of measuring inductances are detected in parallel. This results in a shortening of the duration of the measurement cycle in which all the measuring inductances are measured and the results are evaluated.

A measurement signal can advantageously be evaluated by comparing at least one parameter of the measurement signal with the corresponding parameter of a reference signal determined without the presence of a conductive foreign body, and, using the result of the comparison, a decision is made regarding the presence of a conductive foreign body in the region of the measuring inductance.

Preferably, an alarm signal indicating the presence of a conductive foreign body is generated and input to a display unit and/or a control unit of the charging station, as soon as the presence of a conductive foreign body is detected during the evaluation of the measurement signal of any measuring inductance. In this manner, the measurements that need to be taken in the case of the presence of a foreign body can be started as quickly as possible, even before a measurement cycle has been completed.

At the end of a measurement cycle in which all the groups of measuring inductances were measured and their measurement signals evaluated, from the results of the evaluations of all the individual measurement signals, it is possible to obtain data indicating the location and size of a conductive foreign body. This makes it possible to obtain precise information for the user of the charging station regarding the error that was detected and a quantitative evaluation of the error.

Due to the use of an analog multiplexer, by means of which, before the beginning of the measurement on this group, a group of measuring inductances is connected in each case to said group, the number of measurement devices needed can be limited to the maximum number of the members of a group, as a result of which a savings of hardware for performing the measurements is achieved.

Depending on whether a foreign body was detected before or during an inductive transmission of energy, the inductive transmission of energy can be blocked by a control unit of a charging station, interrupted, or its power reduced. The foregoing is made possible in that a field of a plurality of measuring inductances enables the locating and estimation of the size and shape of a foreign body.

BRIEF DESCRIPTION OF THE DRAWINGS

Below, an embodiment example of the invention is described with reference to the drawings. The drawings show FIG. 1 a diagrammatic representation of a charging station for inductive energy transmission with an electric vehicle in the charging position, FIG. 2 a diagrammatic representation of a device for detecting an electrically conductive foreign body on the primary coil of the charging station of FIG. 1, FIG. 3 a spatial distribution of different groups of measuring inductances of the device of FIG. 2, FIG. 4 a representation of a first part of the method according to the invention in the form of a program flow-chart, and FIG. 5 a representation of a second part of the method according to the invention in the form of a program flow-chart.

DETAILED DESCRIPTION

Figure 1:
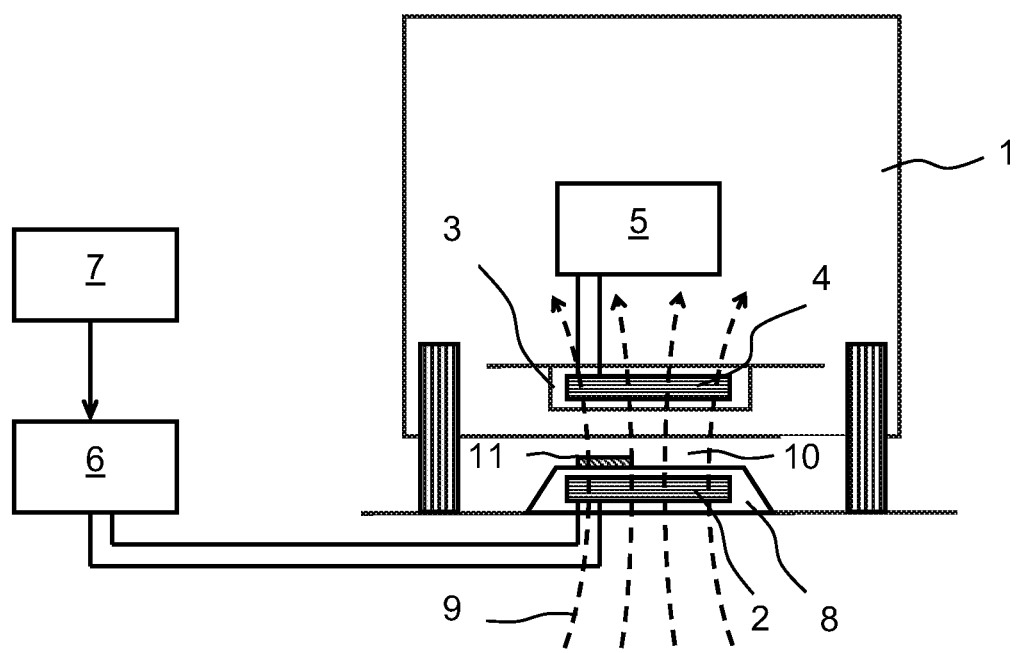

FIG. 1 shows an electric vehicle 1, located for charging its battery over the primary coil 2 of a charging station, in a schematic sectional view (top) and in a schematic plan view (bottom). On the lower side of the vehicle 1, a secondary coil 4, which is connected to a charging electronic system 5, is connected in a housing 3. Said secondary coil converts the parameters of the electric power transmitted inductively to the secondary coil 4 into appropriate values for the charging of the battery of the vehicle 1. The primary coil 2 is supplied by a current supply unit 6 of the charging station and is accommodated in a housing 8 that is immovably fixed on a vehicle parking place. The current supply unit 6 is controlled by a control unit 7 of the charging station.

In FIG. 1, several field lines 9 of the alternating magnetic field generated by the primary coil 2 during operation are depicted as dotted lines. Their main direction corresponds to the direction of the coil axis of the primary coil 2, and thus to the vertical direction. In the gap 10 immediately above the housing 8 of the primary coil 2, a high magnetic field intensity and flux density prevail during operation.

A metal object 11 rests upon the housing 8 of the primary coil 2. The aforementioned metal object may have fallen off another vehicle, for example, which was parked in the charging station in front of vehicle 1. The metal object could also be a utensil that a person lost or an empty soft drink can. Last but not least, the object 11 could also have been intentionally placed by a person for the purpose of sabotage. As already described above, when the primary coil 2 is energized, the object would be heated by the eddy currents induced therein, and, as a result, become a source of hazard. Moreover, the presence of the object would affect the efficiency of the energy transmission to the secondary coil 4.

Figure 2:
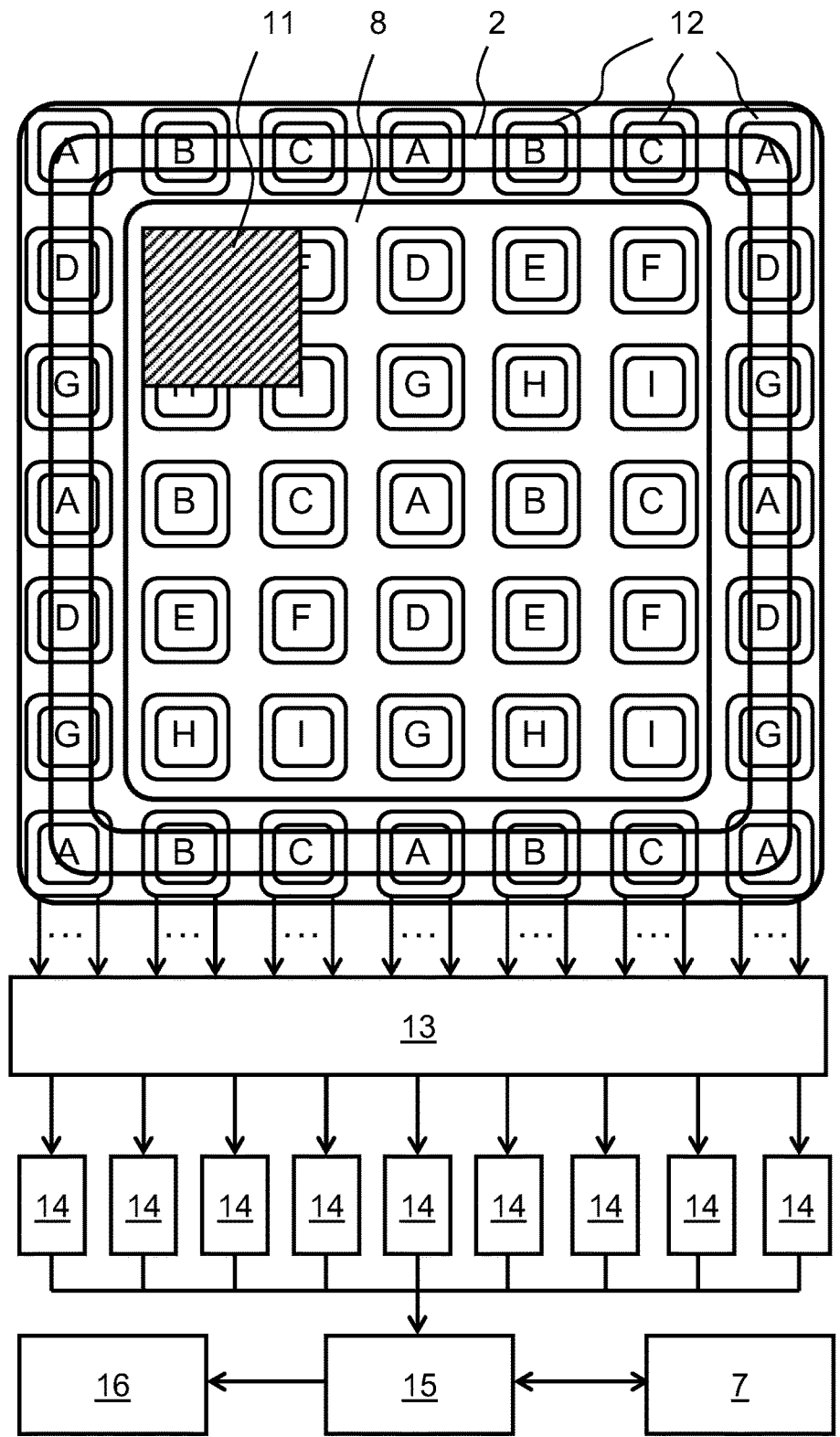

FIG. 2 shows a diagrammatic top view of a device for detecting a conductive foreign body 11 in a charging station of the type explained in reference to FIG. 1, wherein the foreign body 11, rests, as in FIG. 1, on the surface of the housing 8 of the primary coil 2, of which only four windings are depicted in FIG. 2. In order to detect the foreign body 11, in the housing 8, between its upper wall and the primary coil 2, a plurality of measuring inductances 12 are arranged. These measuring inductances 12 in each case are substantially smaller than the primary coil 2. In the example shown, they are implemented in the form of planar coils and, for example, can be implemented in the form of conductive traces on a printed circuit board or a film, which is attached from the inside to the upper wall of the housing 8. In addition, the measuring inductances 12 can be implemented in the form of conductive traces extending directly on the inner surface of the upper side of the housing 8.

The measuring inductances 12 form a regular two-dimensional arrangement in the form of a matrix with identical grid dimension for the rows and columns. The supply lines leading to the individual measuring inductances 12 as well as the supply lines to the primary coil 2 are not represented in FIG. 2 for the sake of clarity. To be able to distinguish them, the measuring inductances 12 in FIG. 2 are marked using a periodic system with letters from A to I. This will be further discussed below.

The measuring inductances 12 are connected via an analog multiplexer 13 to a plurality of identical measurement devices 14. The number of lines actually extending from each column of the matrix of the measuring inductances 12 to the multiplexer 13 depends on the number of rows present in the matrix, which is indicated in FIG. 2 by the points between the two lines leading from each column to the multiplexer 13. The measurement devices 14 are connected to a central evaluation device 15. This evaluation device is connected to the control unit 7 of the charging station and to a display unit 16.

For the detection of a foreign body, the measuring inductances 12 must be energized in each case by a measurement current through the measurement devices 14, which generates around each measuring inductance 12 a measurement field causing eddy currents in a metal foreign body 11 resting on the housing 8 above the respective measuring inductance 12. These eddy currents have an effect on the respective measuring inductance 12 in the form of an increase in its dissipation factor. In the equivalent circuit of a measuring inductance 12, this change is in the form of an additional series resistor, the value of which, depending on location, shape and conductivity of the foreign body 11, can considerably exceed the value of the normal winding resistance.

For the performance of the measurement, different possibilities exist. One of which, for example, is an impedance measurement with a measuring bridge of known type. Another consists of the excitation and the observation of a decaying oscillation of a series resonance circuit by connecting a capacitance charged with a known charge parallel to a measuring inductance, the losses of which largely determine the damping of the oscillation triggered thereby in the series resonance circuit.

Independently of the circuit embodiment of a measurement device 14, a measurement current must be supplied at all times to each measuring inductance 12, and a magnetic field must be generated thereby, in order to be able to detect a conductive foreign body 11. However, the measurement field of each measuring inductance 12 also passes through neighboring measuring inductances 12 and induces a signal there, which causes a measurement error if a measurement is carried out there at the same time. This can result in a foreign body 11 being detected where none is present. If, in order to avoid such erroneous detection due to mutual interference of the measuring inductances 12 with one another, one were to increase the response threshold of the system for the detection of a foreign body 11, then this would worsen the sensitivity, so that small foreign bodies 11 would no longer be detected, resulting in the loss of an essential advantage of the use of a field of numerous small measuring inductances 12 extending over the cross section of the field region of the primary coil 2.

In order to eliminate this problem, according to the invention, not all the measuring inductances 12 are measured at the same time, but different groups of measuring inductances 12 are measured successively, the members of which have a predetermined minimum separation distance from one another, so that the mutual interference, i.e., the measurement error caused by said mutual interference remains below a predetermined threshold. The members of each group are measured simultaneously. In FIG. 2, these groups are marked with the letters A to I, i.e., there is a total of nine such groups. Here, the minimum distance between two members of the same groups in each case is three times the grid dimension of the grid in which the measuring inductances 12 are arranged.

Figure 3:
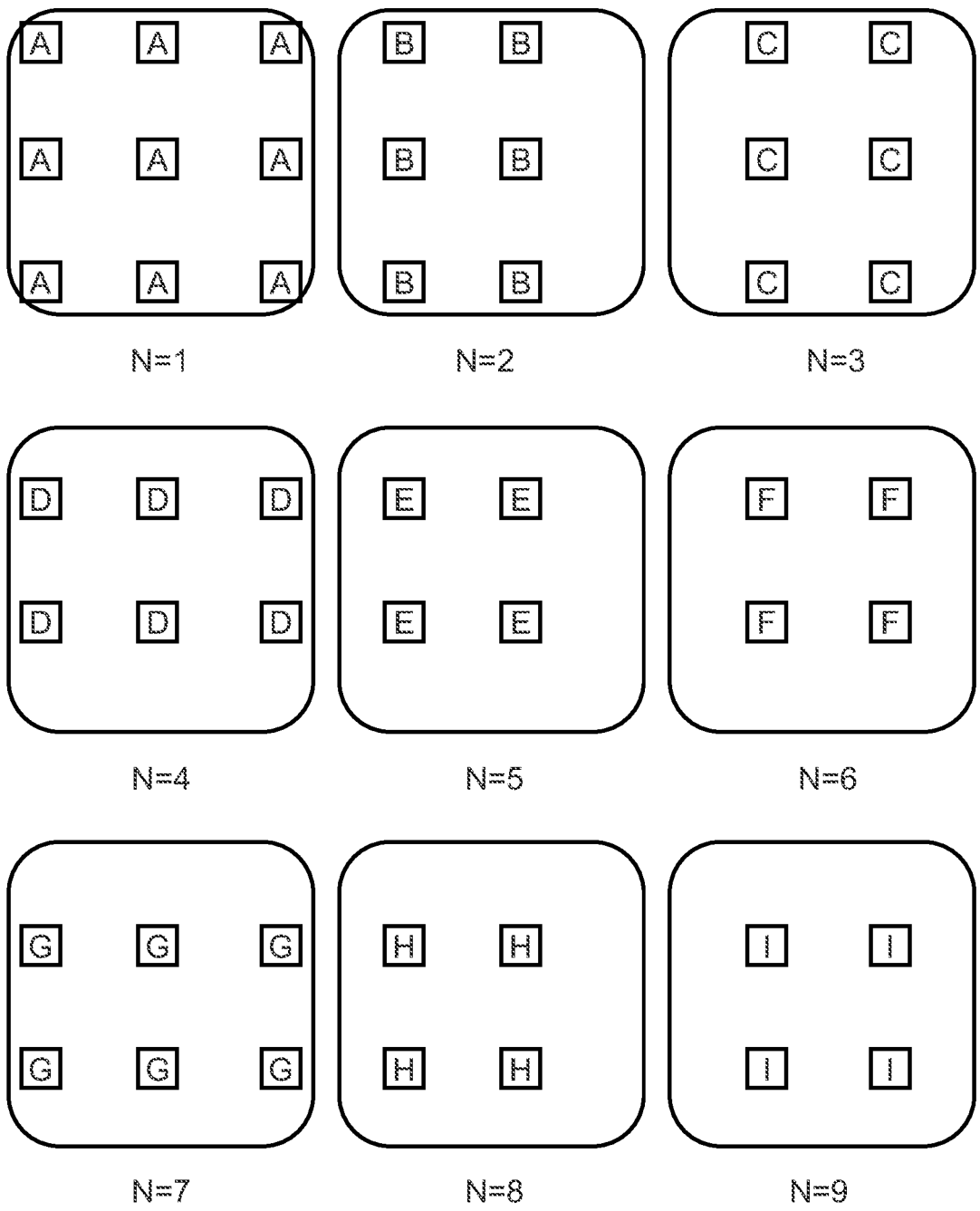

A group-wise separated representation of the distribution of the individual groups A to I over the surface of the housing 8 of the primary coil 2 is shown in FIG. 3. There, it can be seen that the number of the members of the groups is different and that the largest group is group A with nine members. From this it results that, for the simultaneous measurements of all the members of each group, nine measurement devices 14 are needed, as shown in FIG. 2. In the embodiment example shown here, the analog multiplexer 13 therefore must have at least 49 channels for the connection of the measuring inductances 12, and at least nine channels for the connection of the measurement devices 14, wherein, however, all nine channels are required for group A only. In FIG. 3, a value of an index N is associated in each case with the individual groups A to I, to which reference is made below.

Thus, from the number of nine groups A to I, the time for the measurement of all the measuring inductances 12 is nine times the time for the measurement of an individual measuring inductance 12, plus the time for switching through the multiplexer 13. This increase in the measurement time is acceptable in order to prevent mutual interference of the measuring inductances 12 during the measurement.

Figure 4:
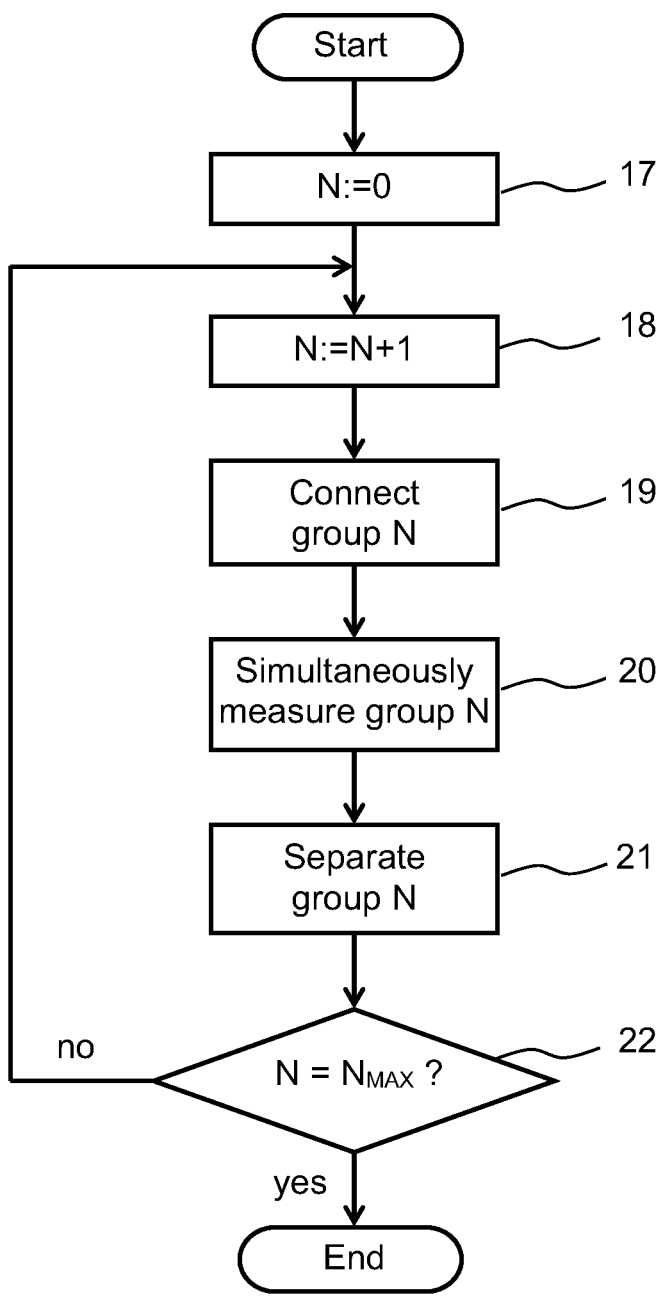

A representation of a first part of the method according to the invention is shown in FIG. 4 in the form of a program flowchart. In step 17, at the beginning of a measurement cycle, the index N of the group of measuring inductances 12 to be measured next is initialized to zero. In step 18, this index is incremented, and in step 19, the group with the current index N is connected to the measurement devices 14 by the analog multiplexer 13. In step 20, all of the measuring inductances 12 of the group currently connected to the measurement devices 14 are measured simultaneously. This also includes the transmission of the measurement values to the evaluation device 15. Subsequently, in step 21, the current group N is again separated from the measurement devices 14 by the analog multiplexer 13. In step 22, it is checked whether the end of a cycle has been reached or not. If not, process control proceeds to step 18, i.e., measurement of the next group is started. Otherwise the measurement cycle is terminated.

Figure 5:
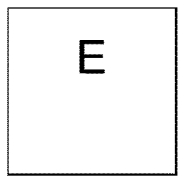
Figure 5:
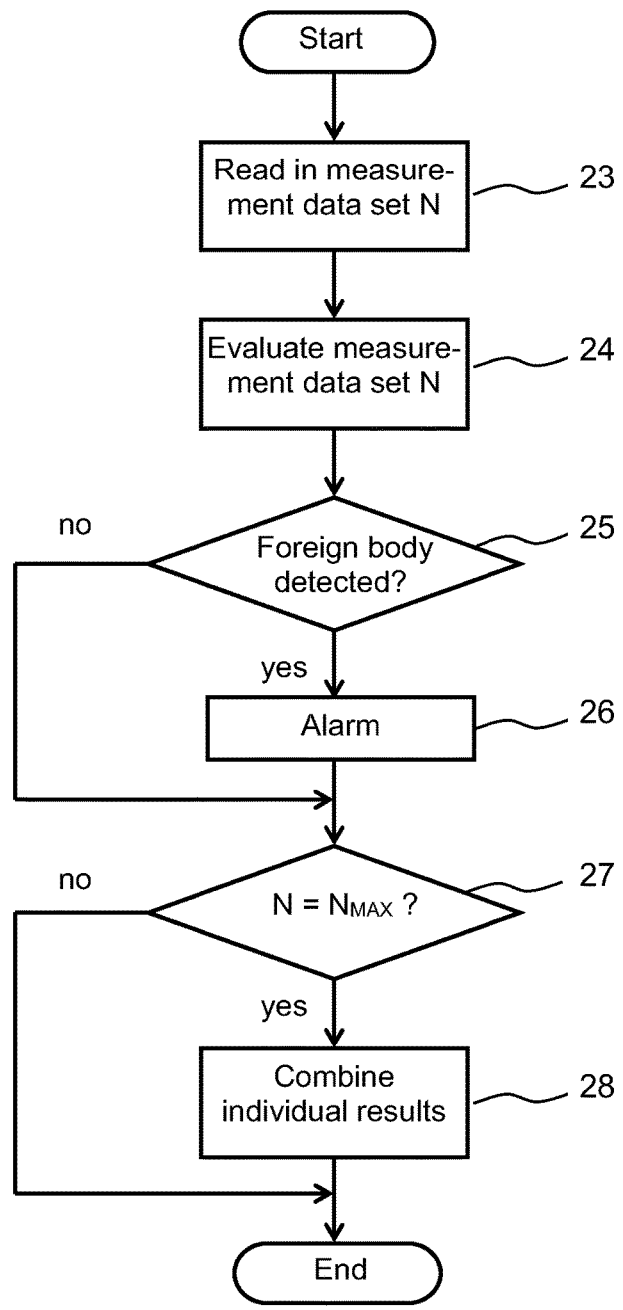

During the measurement of the next group N+1, the evaluation unit 15 already evaluates the measurement data of the most recently measured group N. This evaluation occurring in parallel is also represented in FIG. 5 in the form of a program flowchart. It begins in step 23 with the reading in of a measurement data set from the measurement devices 14. In step 24, the measurement data set is evaluated, in that, from it, for each individual measurement parameter 12 of the measured group N, a parameter is determined and compared with a reference value that was determined without the presence of a conductive foreign body 11 during a calibration, and stored. In step 25, for the determined parameter of each inductance of the measured group N, a verification is conducted to determine whether it differs from a reference value by more than a predetermined threshold. If so, a foreign body 11 is considered to have been detected, and in step 26, an alarm is triggered, which results in a blocking or discontinuation of the energy transmission.

Otherwise, step 26 is skipped, and a verification is carried out to determine whether the most recently evaluated measurement data set is the last one overall, i.e., whether the measurement data set of all the groups of measuring inductances are present. If yes, in step 28, the stored individual results of the preceding passes through step 25 are combined, and, from them, information on the location and size of a foreign body 11 is derived, provided that such a foreign body has already been detected on at least one measuring inductance 12 in step 25. Otherwise, step 28 is skipped, and the processing of the current measurement data set of group N is terminated.

Due to the evaluation of the measurement data set of each group immediately after its acquisition, despite the serial measurement of the individual groups of measuring inductances 12, a conductive foreign body is detected already before the end of a measurement cycle if it has a size that achieves full or partial coverage of several measuring inductances 12. At least one of the covered measuring inductances 12 is then part of a group that is not first measured as the last group, as a result of which, an alarm can be triggered already before the end of the measurement cycle. Thus, in the example shown in FIG. 2, measuring inductances 12 of the groups E, F, H and I are at least partially covered. If the measurements occur in accordance with the numeration in FIG. 3 in alphabetical order of the groups, then the foreign body 11 would already have been detected for the first time using group E, that is, already approximately after half of the cycle time, and not just at the end.

In principle, the probability that the foreign body will be detected early increases with its size, wherein size is understood here to mean primarily the surface area that it covers. However, shape is also important, for example, in that an annular foreign body draws more power from a magnetic alternating field having a given intensity than a rod-shaped foreign body of identical volume, and thus the response threshold of the measurement also depends on the shape of a foreign body.

In the detection of a conductive foreign body 11, the evaluation device 15 outputs an output signal to a display device 16 which emits an optical and/or acoustic warning to the user of the charging station, which can also contain information on the location and size of the foreign body derived from the spatial distribution of the given measuring inductances 12. In addition, the evaluation device 15 also outputs signals to the control unit 7 of the charging station V, which ensure a blocking or discontinuation of the inductive energy transmission, i.e., of the energizing of the primary coil 2, and inform the control unit 7 of the location and size of the detected foreign body 11.

Based on information on location and size of a foreign body 11, the control unit 7 decides whether the energy transmission must stop entirely until the foreign body 11 is removed, or whether an emergency operation at reduced transmission power is still possible, where the warming of the foreign body 11 is still tolerable. This is an advantage of the use of a field of smaller measuring inductances 12 in comparison with a single large measuring inductance which would not enable a locating and size estimation of a foreign body 11. The measurement method according to the invention is usable both before the start of and also during an inductive energy transmission, since the measuring inductances 12 are components separate from the primary coil 2.

In the embodiment examples shown in FIGS. 2 and 3, the distance between two measuring inductances 12 of each group A to I in each case is three times the grid dimension in the direction of the rows and also of the columns. It is understood that the arrangement of the measuring inductances 12 of each group and their mutual separation depend on the shape and the arrangement of the measuring inductances as well as on the strength of the measurement signal, which determines the magnetic field generated in a measurement. For example, if, as in the DE 10 2009 033 237 A1 mentioned at the start, consecutive rows of measuring inductances 12 in each case are arranged offset by half a grid dimension, then a corresponding offset can also occur in the arrangement of the members of the individual groups. For a selected arrangement of measuring inductances 12, the extent of the crosstalk thus must be determined always as a function of the group division, and the group division to be selected is one in which, at minimum separation, the crosstalk remains below an acceptable threshold.

The group division represented in FIGS. 2 and 3 should be understood to be an example. Other divisions are also possible. In addition, the measuring inductances 12 need not be distributed, as in the above represented example, only two-dimensionally over the cross-sectional surface of the field region of the primary coil 2; instead, a three-dimensional distribution can also be provided in the form of two or more mutually laterally offset positions of measuring inductances 12 one on top of the other, within which the distribution in each case is provided two-dimensionally. The invention can also be applied to such multi-layer arrangements of measuring inductances 12 where a simultaneously measured group can also contain measuring inductances 12 of different positions.

What is claimed is:

1. A method for detecting an electrically conductive foreign body on a primary coil of an inductive charging station for an electric vehicle, the method comprising:
   arranging a plurality of measuring inductances on the primary coil side facing during a charging operation a secondary coil of the electric vehicle over the cross section of a field region of the primary coil, the measuring inductances forming a matrix,
   taking a plurality of consecutive measurements of different groups of the measuring inductances such that each measurement on one of the groups of measuring inductances is carried out simultaneously for all of the measuring inductances of the group, and the measuring inductances of each of the groups are separated from one another by at least a predetermined minimum distance which is selected so that crosstalk between measurement signals of individual measuring inductances of each group during the simultaneous measurements on that group remains below a predetermined threshold,
   wherein each of the measuring inductances belongs to one of the groups, and each of the groups includes at least two of the measuring inductances,
   wherein the matrix has a grid dimension in a direction of the rows and in a direction of the columns,
   the predetermined minimum distance is greater than the grid dimension in the direction of the rows and in the direction of the columns,
   the predetermined minimum distance is such that measuring inductances that are adjacent to each other in a row or in a column of the matrix belong to different groups, and
   the crosstalk between measurement signals of individual measuring inductances is mutual interference caused by the magnetic fields originating from those individual measuring inductances during their simultaneous measurement.

2. The method according to claim 1, wherein the measuring inductances of each group are arranged in distributed fashion in a regular pattern over the cross section of the field region of the primary coil.

3. The method according to claim 2, wherein the measuring inductances of each group fill in the cross section of the field region of the primary coil sufficiently so that additional measuring inductances of the same group would be located outside of the cross section of the field region in case of continuation of the regular pattern.

4. The method according to claim 1, wherein during a single measurement cycle in which all of the groups of measuring inductances are consecutively measured, the measurement signals acquired for one of the groups of measuring inductances are evaluated while the measurement signals of a next consecutive one of the groups of measuring inductances are detected.

5. The method according to claim 1, wherein the measurement signal is evaluated by comparing at least one parameter of the measurement signal with a corresponding parameter of a reference signal determined without the presence of a conductive foreign body, and, using the comparison result, a determination is made regarding the presence of a conductive foreign body in the area of the measuring inductance.

6. The method according to claim 1, wherein an alarm signal indicating the presence of a conductive foreign body is generated and input to at least one of a display unit and a control unit of the charging station when the presence of a conductive foreign body is detected.

7. The method according to claim 1, wherein at the end of a measurement cycle, in which all the groups of measuring inductances were measured and the measurement results evaluated, from the results of the evaluation of all the individual measurement signals, data indicating the location and size of a conductive foreign body are determined.

8. The method according to claim 1, wherein before the beginning of the measurement on a group, a group of measuring inductances is connected by an analog multiplexer in each case to one measurement device per measuring inductance.

9. The method according to claim 1, wherein inductive energy transmission is blocked, interrupted, or reduced in power by a control unit of the charging station when the presence of a conductive foreign body is detected.

10. A method for detecting an electrically conductive foreign body on a primary coil of an inductive charging station for an electric vehicle having a secondary coil, the method comprising:
   arranging a plurality of measuring inductances over a cross section of a field region of the primary coil on the primary coil side facing the secondary coil during a charging operation, the measuring inductances forming a matrix, and the plurality of measuring inductances including at least a first group of measuring inductances and a second group of measuring inductances;

taking measurements of the first group of the measuring inductances such that each measurement on the first group of measuring inductances is carried out simultaneously for all of the measuring inductances of the first group, and the measuring inductances of the first group are separated from one another by at least a predetermined minimum distance; and taking measurements of the second group of the measuring inductances such that each measurement on the second group of measuring inductances is carried out simultaneously for all of the measuring inductances of the second group, and the measuring inductances of the second group are separated from one another by at least the predetermined minimum distance, wherein the predetermined minimum distance is selected so that crosstalk between measurement signals of individual measuring inductances of each group during the simultaneous measurements on that group remains below a predetermined threshold that prevents mutual interference between the individual measuring inductances of that group during the simultaneous measurements on that group, taking measurements of the first group occurs before taking measurements of the second group, each of the groups includes at least two of the measuring inductances, and no measuring inductance of the first group is adjacent to another of the measuring inductances of the first group in a row or in a column of the matrix, and no measuring inductance of the second group is adjacent to another of the measuring inductances of the second group in a row or in a column of the matrix.

11. The method according to claim 10, wherein during a single measurement cycle in which the groups of measuring inductances are consecutively measured, the measurement signals acquired for the first group of measuring inductances are evaluated while the measurement signals of the second group of measuring inductances are detected.

12. The method according to claim 10, wherein the measurement signal is evaluated by comparing at least one parameter of the measurement signal with a corresponding parameter of a reference signal determined without the presence of a conductive foreign body, and, using the comparison result, a determination is made regarding the presence of a conductive foreign body in the area of the measuring inductance.

13. The method according to claim 10, further comprising determining location and size data of a conductive foreign body using the measurement signals acquired for the first group of measuring inductances and the measurement signals of the second group of measuring inductances.

14. The method according to claim 10, wherein inductive energy transmission is blocked, interrupted, or reduced in power by a control unit of the charging station when the presence of a conductive foreign body is detected.

15. The method according to claim 1, wherein the predetermined minimum distance is at least three times the grid dimension in the direction of the rows and in the direction of the columns.

16. A method for detecting an electrically conductive foreign body on a primary coil of an inductive charging station for an electric vehicle, the method comprising:

arranging a plurality of measuring inductances on the primary coil side facing during a charging operation a secondary coil of the electric vehicle over the cross section of a field region of the primary coil, the measuring inductances forming a matrix with a grid dimension in a direction of the rows and in a direction of the columns, taking a plurality of consecutive measurements of different groups of the measuring inductances such that each measurement on one of the groups of measuring inductances is carried out simultaneously for all of the measuring inductances of the group, and the measuring inductances of each of the groups are separated from one another by at least a predetermined minimum distance which is selected so that crosstalk between measurement signals of individual measuring inductances of each group during the simultaneous measurements on that group remains below a predetermined threshold, wherein each of the measuring inductances belongs to one of the groups, and each of the groups includes at least two of the measuring inductances, the predetermined minimum distance is greater than the grid dimension in the direction of the rows and in the direction of the columns, and the crosstalk between measurement signals of individual measuring inductances is mutual interference caused by the magnetic fields originating from those individual measuring inductances during their simultaneous measurement.

17. The method according to claim 16, wherein the predetermined minimum distance is at least three times the grid dimension in the direction of the rows and in the direction of the columns.

18. The method according to claim 16, wherein the predetermined minimum distance is at least two times the grid dimension in the direction of the rows and in the direction of the columns.

* * * * *